United States Patent
Rosales

(10) Patent No.: US 8,666,172 B2
(45) Date of Patent: Mar. 4, 2014

(54) PROVIDING MULTIPLE SYMMETRICAL FILTERS

(75) Inventor: Dean Rosales, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 3753 days.

(21) Appl. No.: 09/821,563

(22) Filed: Mar. 29, 2001

(65) Prior Publication Data

US 2002/0141654 A1    Oct. 3, 2002

(51) Int. Cl.
*G06K 9/00*        (2006.01)

(52) U.S. Cl.
USPC ............ 382/215; 382/260; 382/262; 382/263

(58) Field of Classification Search
USPC ............... 382/215, 54, 27, 260–263; 333/167
See application file for complete search history.

(56) References Cited

U.S. PATENT DOCUMENTS

| | | | | |
|---|---|---|---|---|
| 5,027,423 A | * | 6/1991 | Kawata et al. | 382/261 |
| 5,151,953 A | * | 9/1992 | Landeta | 382/279 |
| 5,351,312 A | * | 9/1994 | Sato et al. | 382/252 |
| 5,835,630 A | * | 11/1998 | Schweid et al. | 382/173 |
| 6,535,632 B1 | * | 3/2003 | Park et al. | 382/164 |
| 7,356,197 B2 | * | 4/2008 | Lippincott et al. | 382/265 |

* cited by examiner

*Primary Examiner* — Wesley Tucker
(74) *Attorney, Agent, or Firm* — Trop, Pruner & Hu, P.C.

(57) ABSTRACT

Input image data may be subjected to a spatial convolution to produce a plurality of different filter matrices or kernels. Thus, a single system may be capable of producing a plurality of different filter sizes which may be selected based on particular circumstances, uses and described precision. Thus, a single system may provide variable spatial filtering. By reducing the input data matrix size and by reusing components, in some cases, the computational complexity of producing a plurality of symmetrical filters is not significantly greater than that involved in producing only a single filter.

20 Claims, 7 Drawing Sheets

PROVIDING MULTIPLE SYMMETRICAL FILTERS

BACKGROUND

This application relates generally to digital image processing.

Digital image processing may involve pixel group processing. Digital image processing may be used in cameras, scanners, and video applications, as examples. Pixel group processing involves a group of proximate pixels surrounding a center pixel. The pixels that surround the center pixel may provide information about brightness in a processed region. This brightness information may be utilized in connection with spatial filtering.

Any image may be composed of a plurality of frequency components including both low, high and intermediate frequencies. High spatial frequency components generally involve rapid brightness transitions. Low spatial frequency components involve slowly changing brightness transitions. Generally high frequencies may be found in association with sharp edges or points where white to black transitions occur within one or two pixels, as two examples.

An image may be filtered to accentuate or reduce any particular band of spatial frequencies such as high or low frequencies. Digital image processing techniques for removing particular frequency bands may be called spatial filtering operations.

Spatial filters may be implemented using a spatial convolution. A spatial convolution calculates what is going on with the pixel brightness around a particular processed pixel. The spatial convolution process may use a finite impulse response (FIR) filter.

A spatial convolution process may move across a representation of an image, pixel-by-pixel, placing resulting pixels in an output image. The brightness of each output pixel may depend on the input pixels that surround a particular processed pixel. A spatial convolution may calculate a spatial frequency in the area of a central pixel. As a result, the convolution may be capable of achieving filtering based on a region's spatial frequency content.

A spatial convolution may use a mathematical construction of the input pixel and its neighbors to determine an output pixel brightness value. A kernel is a group of pixels used to determine a mathematical calculation of output pixel brightness values. Kernel dimensions are generally that of a square with an odd number of values in each dimension. Thus, a kernel may have dimensions of 1×1, which would amount to a point, 3×3, 5×5 and so on. The greater the kernel size, the more neighboring pixels that are used in the calculation of the pixel brightness value.

A weighted average calculation is called a linear process. A weighted average may be utilized to determine the pixel brightness value. A linear process involves a summation of elements multiplied by constant values. The elements are pixel brightnesses in the kernel and the constant values are the weights or convolution coefficients.

Taking as an example a 3×3 kernel convolution, a center pixel is evaluated in view of its eight neighbors. A convolution mask may be utilized to produce an output pixel value. The center pixel and its eight neighbors are multiplied by their respective convolution coefficients and the multiplicands may be summed. The result is placed in the output image at the same center pixel location. The process continues pixel-by-pixel for the pixels in a representation of an input image.

Thus, the equation for the spatial convolution process is follows:

$$O(x,y)=aI(x-1,y-1)+bI(x,y-1)+cI(x+1,y-1)+dI(x-1,y)+eI(x,y)+fI(x+1,y)+gI(x-1,y+1)+hI(x,y+1)+iI(x+1,y+1).$$

Common spatial filtering operations may include high-pass, low-pass and edge enhancement filters. Other filtering operations may be utilized as well. A problem arises in that different kernel sizes may be needed in different situations. Conventional convolution masks generally only determine a single kernel size. In some cases, a plurality of difference kernels may be needed. For example, in some cases, issues arise with respect to pixels closer to and/or further away from the current pixel.

Thus, there is a need for a system which provides multiple symmetrical filters at the same time.

DETAILED DESCRIPTION

A plurality of symmetrical filters may be calculated simultaneously so that kernels of different sizes are available as needed. In one embodiment, an nxn kernel may be folded along the row and column directions to produce a compacted kernel. This compacted kernel may be subjected to additions and multiplications in accordance with a spatial filtering algorithm in a way that enables outputs of a variety of desired kernel sizes.

Thus, a plurality of filters of different sizes may be determined from the same image data, for example in 3×3, 5×5, 7×7, 9×9 and 11×11 sizes. These sizes may be desirable for enabling spatial filtering with selectable degrees of freedom.

For example, in pixel group processing, the larger the size of the kernel of pixels used in the calculation of the weighted average of the input pixel brightness values, the greater the degree of freedom of the spatial filter. For example, the flexibility and precision of a spatial filter may be improved when more neighboring pixels are utilized in the calculation. Thus, the degree of precision or the degree of flexibility may be balanced with the speed of calculation, for example to select one of a variety of available kernel sizes for use in spatial filtering in a given case.

Figure 1:
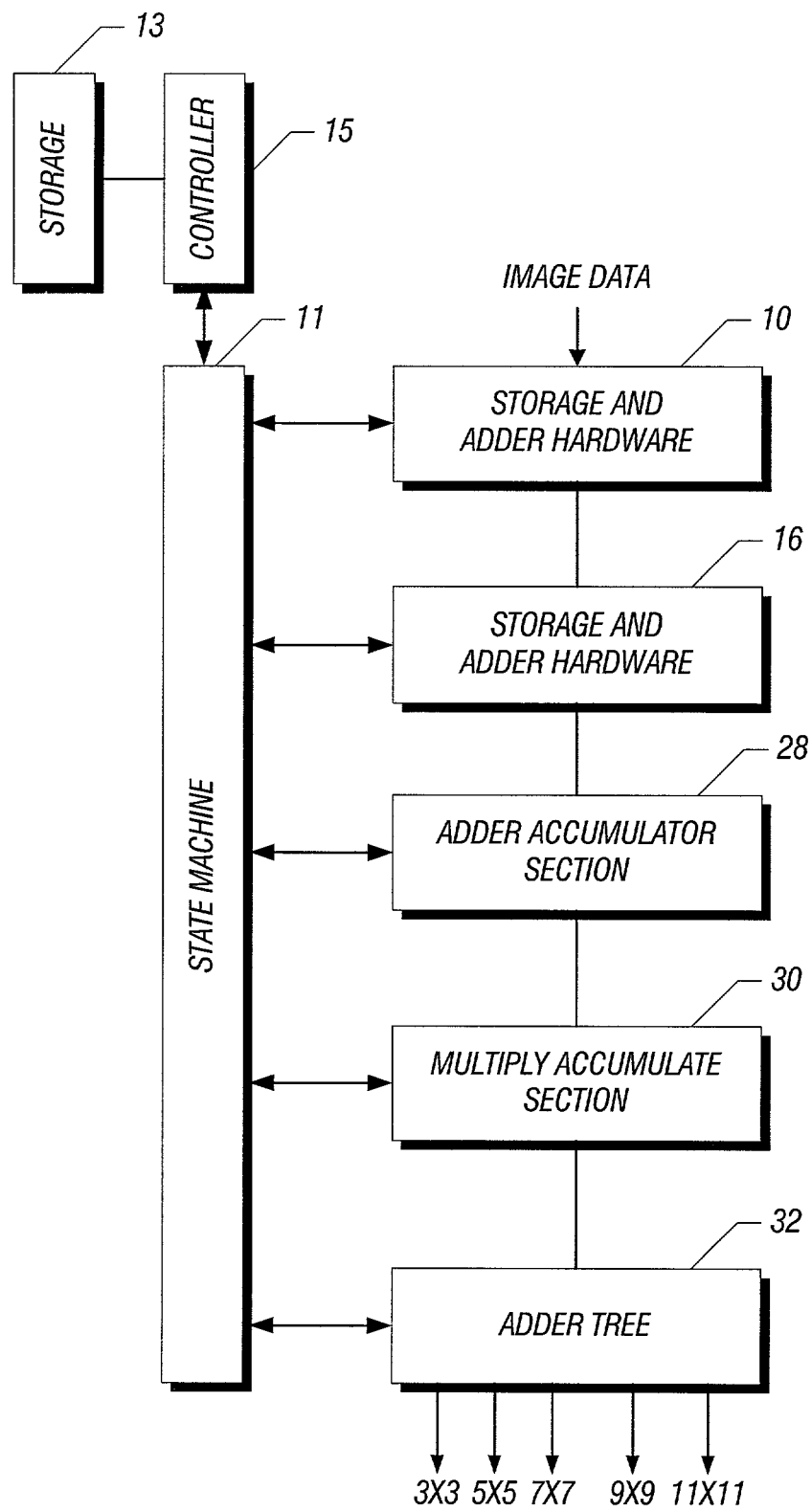
FIG. 1 is a block depiction of one embodiment of the present invention.

Referring to FIG. 1, image data may be captured in a variety of different ways. For example, a digital imaging system may capture image data in a form of brightness values for an array of pixels that together may be utilized to recreate an image. The image data may be stored in a storage and adder hardware 10. Storage and adder hardware 10 may be responsible for adding together symmetrical rows of data to reduce the image data matrix size. Then the image data may be stored in a storage and adder hardware 16 which likewise reduces the matrix size by adding together symmetrical columns of image data.

Next, an adder accumulator section 28 and a multiply accumulate section 30 perform addition and multiplication sequences needed to implement a linear process or spatial convolution. Finally an adder tree 32 may be utilized to complete the calculation and to output a plurality of different kernel or matrix sizes.

In the illustrated embodiment, four kernel sizes are provided including 3×3, 5×5, 7×7, 9×9, and 11×11 matrices. Each of these output matrices may be selectably utilized, for example depending on the degree of freedom desired for a particular system. Because a plurality of different symmetrical filters are available at any given time, the flexibility of the system may be significantly increased in some cases. Moreover, the computational complexity is not proportionally increased because many components and calculations may be reused in each kernel calculation.

Each of the units 10, 16, 28, 30 and 32 may be operated under control of a state machine 11. The state machine 11 may provide information about where data should be stored, where data should be acquired, and what operations may be used to derive a desired result. The state machine 11 may be in turn controlled by a controller 15 such as a processor-based system. The state machine 11 may also include a storage 13. The storage 13 may include separate storage areas in one embodiment for storing the folded row and the folded column information.

The state machine 11 may be controlled by the controller 15 to provide a desired number of output kernel sizes. In addition, in some cases the state machine 11 may be controlled by the controller 15 to stop the determination of the kernel sizes. For example, in one embodiment, the kernels are produced one after the other from smaller to larger sizes. If a sufficient kernel is obtained, the state machine 11 may be stopped by the controller 15 to save time and to go on to other calculations. In other cases, it may be necessary to have a variety of kernel sizes. The state machine 11 may be programmed to output the desired array of kernel sizes.

Figure 2:
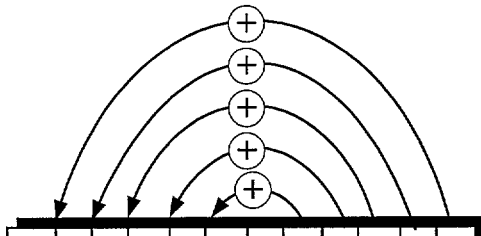
FIG. 2 is a functional depiction of one embodiment of the present invention.

Referring to FIG. 2, an 11×11 array of image data may reside in the storage and adder hardware 10. The array may be read columnwise. The columns are indicated as C1 through C11. After an initial set of filters is calculated, a subsequent column is read and a center pixel moves to the right by one. The process may be repeated until reaching the final column of data. Thus, an 11×11 window slides across the original page of data.

Figure 3:
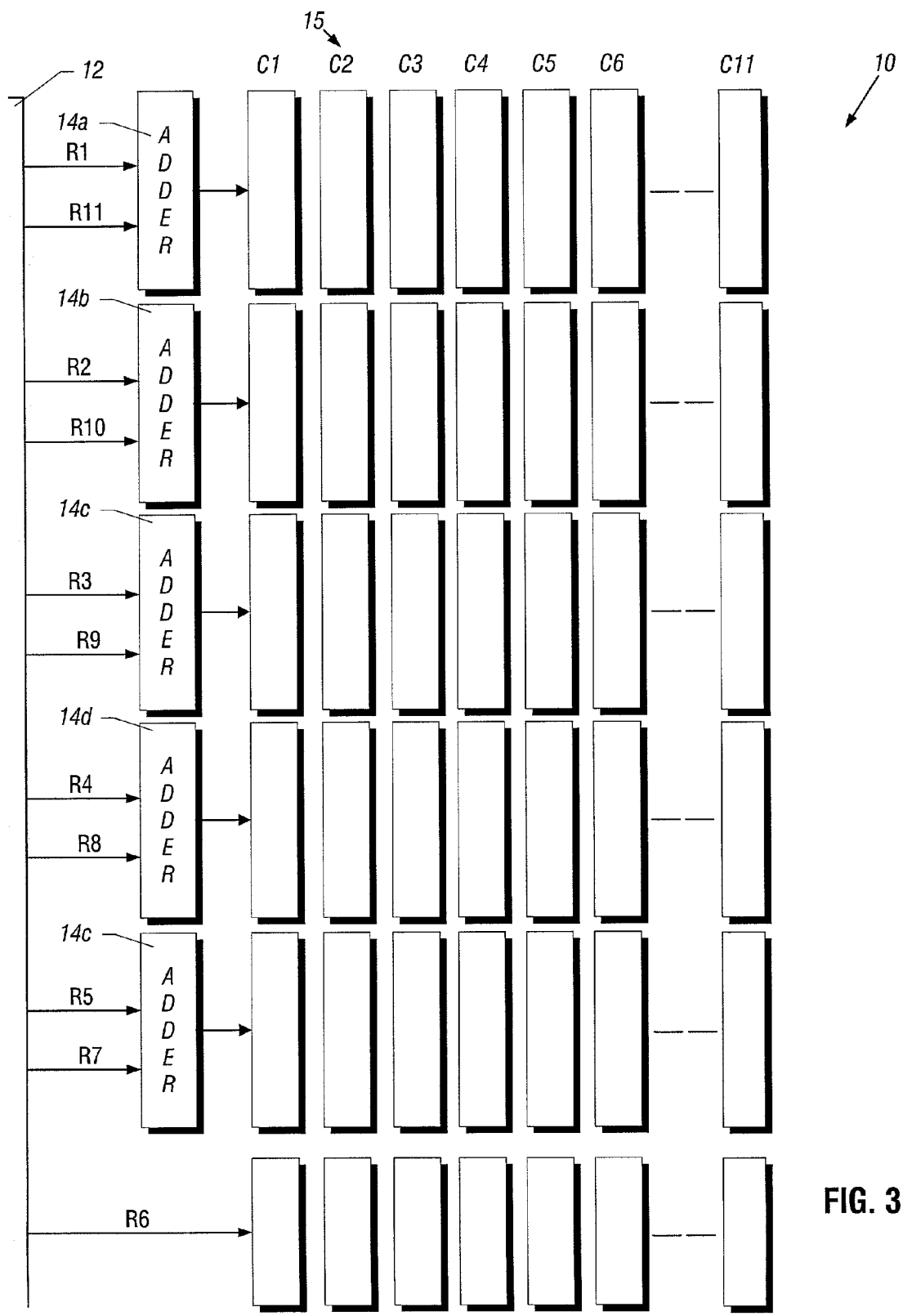
FIG. 3 is a block diagram showing hardware for implementing the function illustrated in FIG. 2 in accordance with one embodiment of the present invention.

As shown in FIG. 3, the symmetry in the data may be exploited to pre-add pixel data that will be multiplied by the same convolution coefficient. For example, because of symmetry, the diagonals may all use the same convolution mask coefficients (1, 2, . . . 11) in one embodiment. The symmetry may be used to reduce the number of rows of data. Thus, as illustrated, row 11 (R11) is added to row 1 (R1), row 10 (R10) is added to row 2 (R2), row 9 (R9) is added to row 3 (R3), etc. Row 6 (R6) is not added to any other row.

The row pre-adder 10 adds the rows together as the data is clocked into a hardware unit. The result is a 6×11 kernel. Row 6 (R6) remains as in the original data since it did not have a corresponding row to be added with.

Thus, row 1 (R1) and row 11 (R11) are added by adder 14a, row 2 (R2) and row 10 (10) are added by adder 14b, etc. The new array includes only six rows but still includes eleven columns (C1 through C11).

Figure 4:
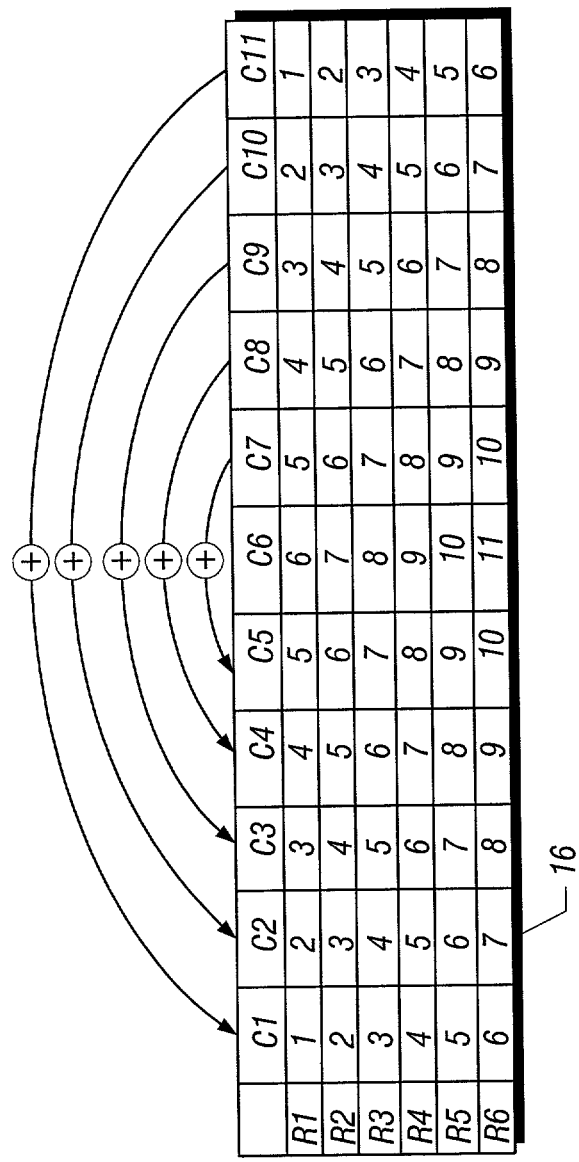
FIG. 4 is a functional depiction of one embodiment of the present invention.

Referring next to FIG. 4, the columns may be pre-added together to reduce the number of columns. Again the reduction is possible because of the inherent symmetry of the matrix. Thus, column 11 (C11) may be added to column 1 (C1), column C10 (C10) may be added to column 2 (C2) and so on. Again, column 6 (C6) has no associated column and therefore it is not added to any other column.

Figure 5:
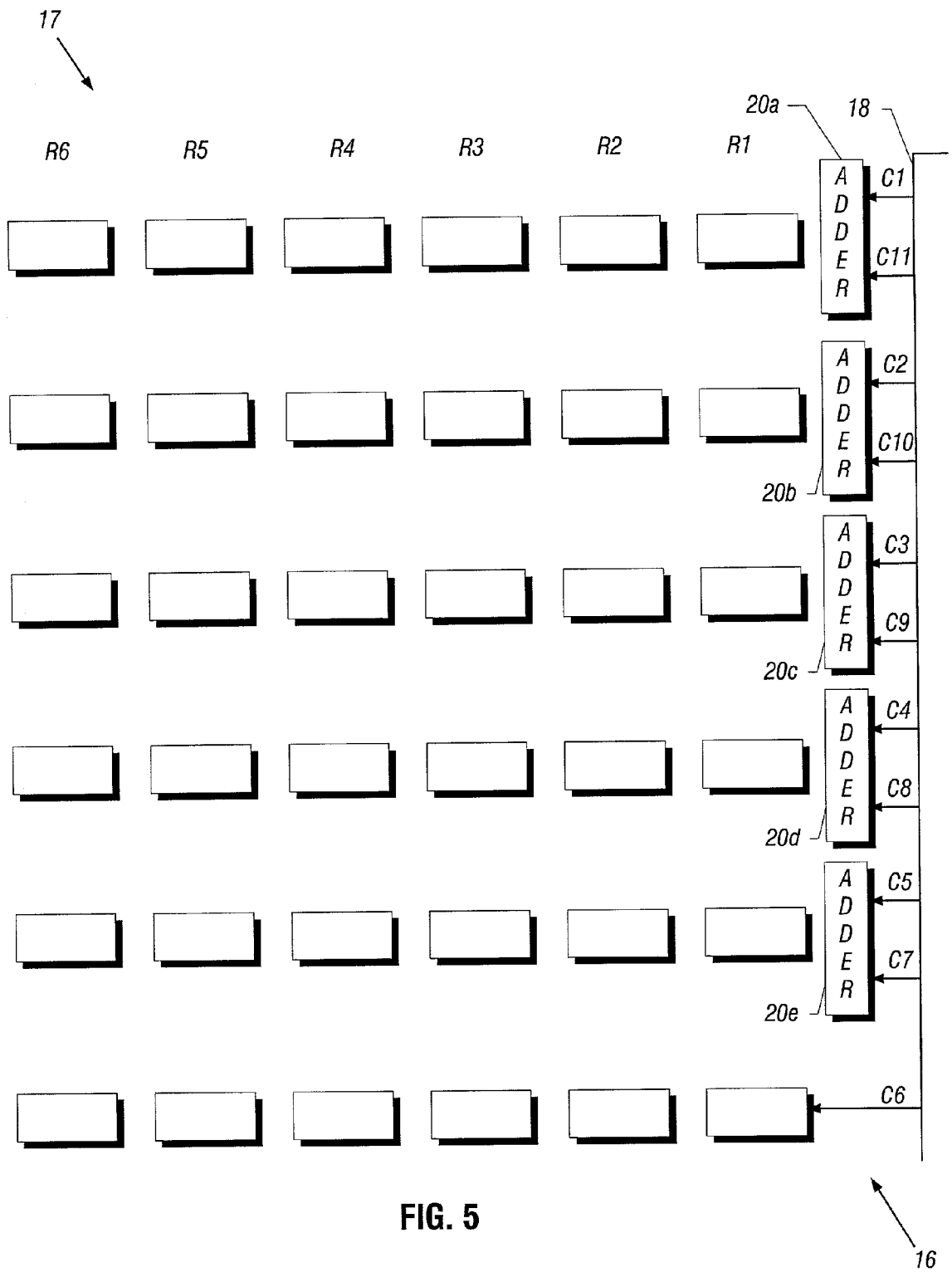
FIG. 5 is a block diagram depicting hardware for implementing the function shown in FIG. 4 in accordance with one embodiment of the present invention.

Turning next to FIG. 5, the column pre-adder circuitry 16 includes a plurality of adders 20 which receive the appropriate columns from the memory 10 and add them together. The six rows and six columns are then stored in the hardware 16. The storage area for holding the 6×6 matrix may be different from the 6×11 storage area. The value of using a separate storage area arises from the usefulness of reusing the data currently being held in the 6×11 storage area. Since the filter window is sliding across a page of data, new columns of data need to be read in, in order to calculate the next set of filters. As a result, the 6×11 matrix is fed the new column of data and one column of old data is discarded.

Figure 6:
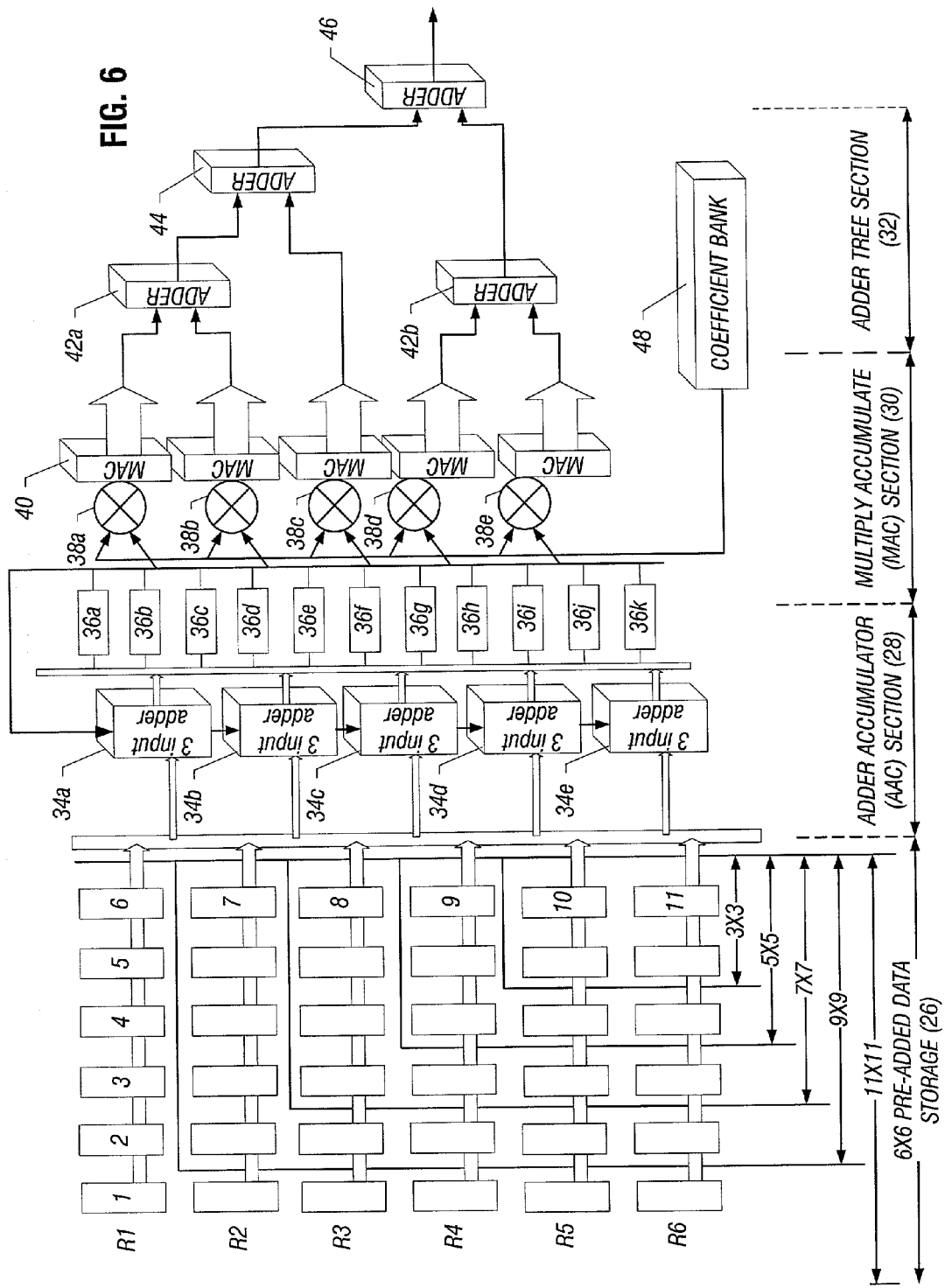
FIG. 6 is a block diagram showing hardware in accordance with one embodiment of the present invention.

Referring next to FIG. 6, the filter values for a plurality of different filter kernel or matrix sizes are then calculated. Firstly, the values from the storage 26 in the hardware 16, that are needed to calculate a given kernel size, are identified. For a given symmetrical kernel size, some of the data values can be added together prior to multiplying with the corresponding convolution coefficient. In one example, because of symmetry, data values that lie in any given diagonal may be multiplied by the same coefficient. Thus, the diagonal 6 is from row 1, column 6 to row 6, column 1 and the diagonal 7 is from row 2, column 6 through row 6, column 2, etc.

In one embodiment, the filters may be calculated in order from the smaller to larger kernel size. Thus, in the illustrated embodiment, the 6×6 pre-added data storage 26 is utilized to first calculate the 3×3 matrix using row 5, columns 5 and 6 and row 6, columns 5 and 6 and then progressing as illustrated in FIG. 6 through the 5×5, 7×7, 9×9 and 11×11 matrices.

Due to the symmetry, some intermediate values calculated for each of the filter sizes may be reused in calculating a subsequent filter. Reuse may reduce the number of calculations needed to perform the larger filter calculations, reducing the number of clocks to perform the overall filter calculation. The state machine 11 implements the re-use of intermediate values.

To calculate a given filter, some of the values in a given diagonal may be added together and accumulated in the adder accumulator (AAC) section 28 in one embodiment. These results may be saved for use in subsequent filter calculations.

The calculation of the 3×3 filter utilizes the data in the box labeled 3×3 in the storage 26. The pre-added data value sitting in row 6, column 6 (the data value in diagonal 11) is directed by the state machine 11 to the register 36k in the section 28. No adding by an adder 34 is needed because the diagonal 11 includes only a single pre-added value.

The pre-added data in diagonal 10 may use one of the AAC section 28 adders 34 and the result is stored in the holding register 36j. In particular, the state machine 11 causes a specified adder, such as the adder 34e, to add the values in diagonal 10 (row 6, column 5 and row 5, column 6) and to place the result in the register 36j, for example. The data value in row 5, column 6 that belongs to diagonal 9 is moved directly to the accumulator storage area 36i, again because no adding is necessary.

Three multipliers, such as multipliers 38c, 38d and 38e, are used to perform the multiplication of the three data values in the registers 36i-k with their respective convolution coefficients from the coefficient bank 48. The multiplication results from the multipliers 38d and 38e are added by the adder 42b and that result is added, in the adder 46, to the result of the multiplier 38c. Each of the components shown in FIG. 6 may be controlled by the state machine 11.

To calculate the 5×5 filter, the data elements contained within the box labeled 5×5 in the storage 26 are used. Starting at the lower right hand corner of the data storage 26 and moving up, the data value on the diagonals 11 and 10 are already sitting in their respective accumulators ready for multiplication due to the prior calculation of the 3×3 filter. The values for diagonal 9 need to be added together. One of the data points, row 5, column 5, is sitting in the accumulator section 28. The remaining two values, in row 4, column 6 and row 6, column 4, need to accumulated. One of the accumulator section adders 34 may be utilized for this function and the result may be stored in a register 36i.

There are two values for diagonal 8 (row 4, column 5 and row 5, column 4) that need to be added together and stored in the register 36h. One of the adder accumulator section adders 34 may be used to accomplish this task with the result being saved in register 36h.

The value for diagonal 7 (row 4, column 4) may be moved into register 36g. The multiply accumulate section 30 may be utilized to perform the final multiplication step. The values sitting in the registers 36g through 36k are multiplied by their corresponding coefficients from the coefficient bank 48. The coefficients used for the 5×5 matrix are not necessarily the same as those used for the 3×3 matrix.

The remaining filters may be calculated the same way. The larger filters may require more multiplications to complete the filtering process. The multiply accumulate section 30 may be used to calculate portions of the filter and subsequently to calculate the remaining data points.

The matrix shown in FIG. 2 has a symmetry not only about row 6 and column 6 but also a symmetry along the diagonals. Embodiments of the present invention may be utilized with a variety of other types of symmetry. Other potential symmetry includes symmetry about a middle row and column but with no diagonal symmetry. In some cases, the difference in symmetry may necessitate differences in the calculations.

In some embodiments of the present invention, many of the steps are done in parallel, reducing the overall number of clocks needed to generate a result. The calculations may be pipelined in some embodiments and many steps may be accomplished in one clock cycle. Latencies may begin to accumulate when the multiply accumulate operations occur. The multiply accumulate latencies occur when calculating larger filters.

Thus, in one embodiment, adding the rows together may take five clocks, adding the columns together may take five clocks, the calculation of a 3×3 matrix may take one clock, a 5×5 matrix may take one clock, a 7×7 matrix may take two clocks, a 9×9 matrix may take two clocks and the 11×11 matrix may take three clocks. Thus the initial estimate of overall filter performance may be viewed as calculating all filters every ten clocks. Estimates for individual filters may vary and may be determined on a case by case basis.

Performance may be based on a given filter's symmetry, the amount of available hardware resources, and the kernel sizes specified. Storage areas 15 and 17, shown in FIGS. 2 and 4, may be made of discrete registers, utilizing random access memory with appropriate controls in one embodiment. This implementation may reduce the number of gates but may decrease the overall performance of the filter. The number of multiply accumulate devices 40 may be reduced to save gates but similarly the overall performance may be reduced.

While embodiments of the present invention have been described with respect to an 11×11 window, other window sizes may be utilized as well. Any of the variety of types of symmetry may be exploited. Any combination of one or more filters may be calculated simultaneously. The multiply accumulate section 30 may use floating point units in one embodiment to address additional applications.

Figure 7:
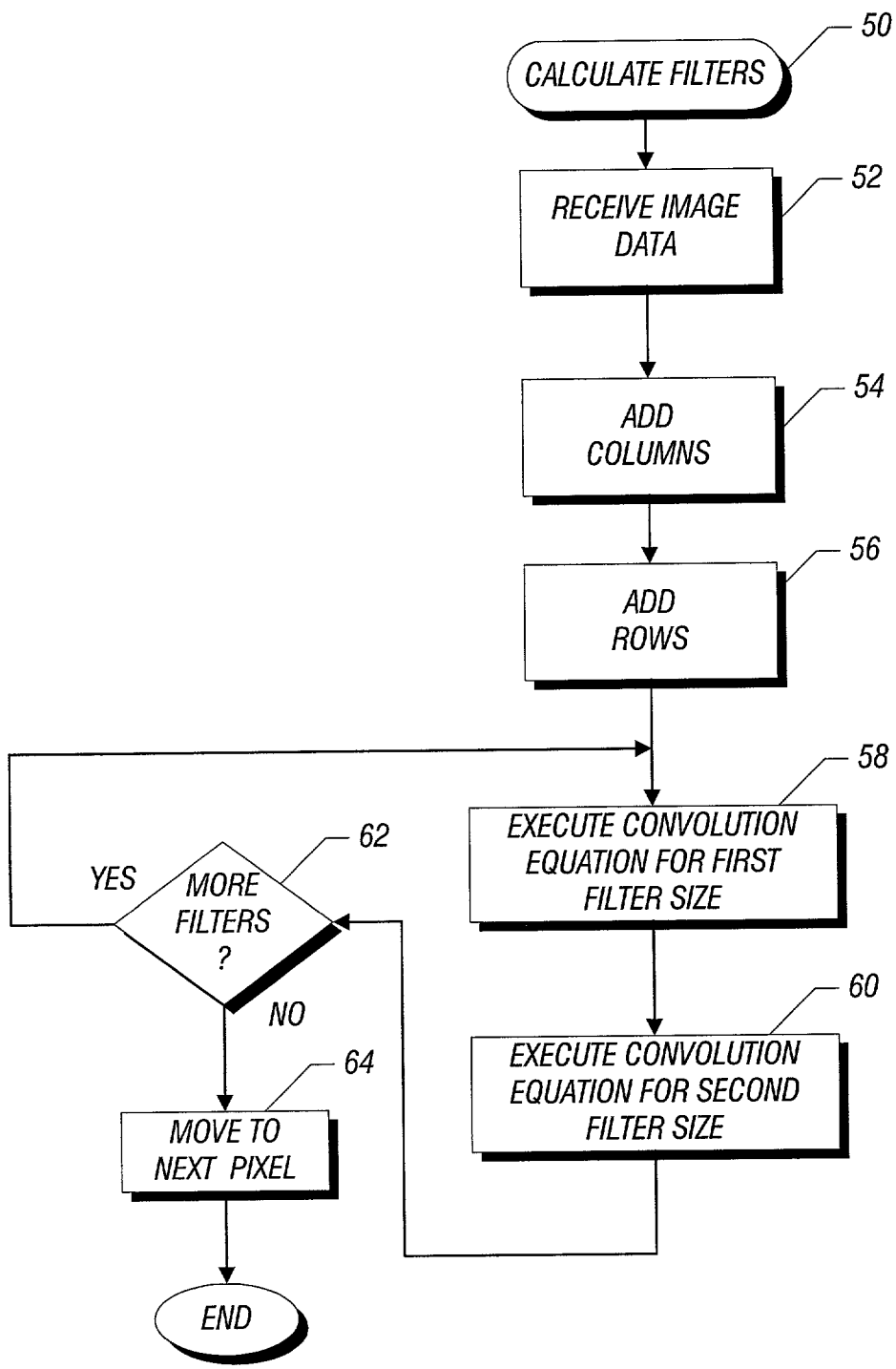
FIG. 7 is a flow chart for software in accordance with one embodiment of the present invention.

Referring to FIG. 7, the filter calculation software 50 may be executed by the controller 15 to control the state machine 11 in accordance with one embodiment of the present invention. In another embodiment of the present invention, the calculation of filter coefficients may be done in whole or in part using software routines. In such case, all or some of the hardware depicted in FIG. 1 may be unnecessary and instead the controller 15 loaded with the software 50 may be utilized to calculate the filter kernels.

Continuing in FIG. 7, the image data is received as indicated at 52. Thereafter, the columns are added (block 54) and the rows are added (block 56) to reduce the matrix size in one embodiment. The convolution equation is executed for a first, smaller filter size as indicated in block 58. Then, the convolution equation is executed for a larger, second filter size (block 60). Calculations that were done for the first filter size may be maintained and reused during the calculation of the second filter.

At diamond 62 a check determines whether there are more filters to calculate. If so, the flow iterates. If not, the flow moves to the next adjacent pixel and the window moves likewise by one. The routine depicted in FIG. 7 may then be repeated for the neighboring pixel. The software 50 may in one embodiment progressively output the smaller filter and then the larger filter. In addition, any number of filters may be progressively calculated.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. The method comprising:
   receiving in a digital image processor, image data; and
   simultaneously calculating, in said processor, at least part of two filters of different sizes from said data; and
   receiving data values in rows and columns, and adding together data values along diagonals.

2. The method of claim 1 wherein receiving data includes receiving a matrix of data having rows and columns, and reducing the number of rows and reducing the number of columns.

3. The method of claim 2 including adding rows together and adding columns together.

4. The method of claim 1 including progressively calculating filters from smaller to larger sizes.

5. The method of claim 4 including receiving image data values, adding the values together, and multiplying the values by convolution coefficients.

6. The method of claim 5 including reusing the results of said additions and multiplications calculated for one filter size, when calculating a filter of a larger size.

7. The method of claim 1 including calculating at least two filters for a first pixel among said image data and then calculating a filter for an adjacent pixel.

8. The method of claim 1 including successively calculating filters of progressively larger size.

9. An article comprising a non-transitory computer readable medium storing instructions that enable a processor-based system to:
   receive image data;

simultaneously calculate at least part of two filters of different sizes from said data; and receive data values in rows and columns, and add together data values along diagonals.

10. The article of claim 9 further storing instructions that enable the processor-based system to reduce the number of rows of image data and reduce the number of columns of image data.

11. The article of claim 10 further storing instructions that enable the processor-based system to ad values associated with rows together errand to add values associated with columns together.

12. The article of claim 9 further storing instructions that enable the processor-based system to progressively calculate filters from smaller to larger size.

13. The article of claim 12 further storing instructions that enable the processor-based system to receive image data values, add the values together, and multiply the values by convolution coefficients.

14. The article of claim 13 further storing instructions enable the processor-based system to reuse the results of said additions and multiplications calculated for one filter size, when calculating a filter of a larger size.

15. The article of claim 9 further storing instructions that enable the processor-based system to calculate at least two filters for a first pixel among said image data and then calculate a filter for an adjacent pixel.

16. The article of claim 9 further storing instructions that enable the processor-based system to successively calculate filters of progressively larger size.

17. The system comprising:
a first set of adders to add together rows and to add together columns of image data; and
a second set of adders and a first set of multipliers to calculate at least two different filter sizes from said image data, said system to simultaneously calculate at least part of two filters of different sizes from said image data, said second set of adders adds image data along diagonals.

18. The system of claim 17 that progressively calculates filters from smaller to larger sizes.

19. The system of claim 18 that utilizes the results from said second set of adders and first set of multipliers for one filter size, when calculating a filter of a larger size.

20. The system of claim 17 including a state machine that control the operation of said first and second adders and said first set of multipliers.

\* \* \* \* \*